(12) United States Patent
Capek et al.

(10) Patent No.: US 6,513,798 B2
(45) Date of Patent: Feb. 4, 2003

(54) INTEGRAL BRACKET AND END MOUNTING PLATE FOR AIR SPRING

(75) Inventors: Jeffrey T. Capek, Fishers, IN (US); Daniel Levy, Chigwell (GB); Daniel J. Leonard, Carmel, IN (US); Mohamad Taghizadeh, Indianapolis, IN (US); Stan W. DeLizo, Lynwood, WA (US); Michael David, Everett, WA (US); Leo M. Schmidt, Seattle, WA (US); William D. Krusel, West Bloomfield, MI (US)

(73) Assignee: BFS Diversified Products, LLC, Carmel, IN (US)

( * ) Notice: Subject to any disclaimer, the term of this patent is extended or adjusted under 35 U.S.C. 154(b) by 0 days.

(21) Appl. No.: 09/995,105

(22) Filed: Nov. 27, 2001

(65) Prior Publication Data

US 2002/0109275 A1 Aug. 15, 2002

Related U.S. Application Data

(63) Continuation of application No. 09/478,641, filed on Jan. 6, 2000, now abandoned.
(60) Provisional application No. 60/160,977, filed on Oct. 22, 1999.

(51) Int. Cl.$^7$ .................................................. F16F 9/04
(52) U.S. Cl. .................................. 267/64.27; 267/64.19
(58) Field of Search ........................... 267/64.11, 64.27, 267/64.28, 64.15, 64.16, 64.19, 64.23, 64.24

(56) References Cited

U.S. PATENT DOCUMENTS 3,043,582 A 7/1962 Hirtreiter
3,850,437 A 11/1974 Owen
3,876,193 A 4/1975 Glary
4,386,791 A 6/1983 Watanabe (List continued on next page.)

FOREIGN PATENT DOCUMENTS

| DE | 42 30 249 A1 | 3/1994 |
|---|---|---|
| EP | 0 264 573 | 8/1987 |
| WO | WO 00/73676 A1 | 5/1999 |

*Primary Examiner*—Jack Lavinder
*Assistant Examiner*—Benjamin A Pezzlo
(74) *Attorney, Agent, or Firm*—John M. Vasuta; Mike Sand

(57) ABSTRACT

An integral one-piece end plate and bracket combination is formed of a high strength plastic and is mounted in an airtight sealing engagement with an open end of a flexible elastomeric sleeve which forms the fluid pressure chamber of an air spring. The end plate includes a semi-circular wall which extends perpendicular to a longitudinal axis of the air spring and a semi-circular opening. The bracket includes an upstanding wall perpendicular to the semi-circular wall of the end plate and a half dome-shaped wall, which together with the upstanding wall, forms an auxiliary fluid chamber which is in fluid communication through the semi-circular opening with the main fluid chamber of the flexible sleeve. The upstanding wall includes attachments for securing the bracket and end plate to a support structure which aligns with a longitudinal axis of the air spring. A fluid inlet conduit extends outwardly from the upstanding bracket wall to provide fluid communication between the auxiliary fluid chamber of the bracket and an external source of pressurized fluid. A plurality of reinforcing ribs are formed on the walls of the bracket and on the end plate to provide a rigid structure.

25 Claims, 5 Drawing Sheets

U.S. PATENT DOCUMENTS

| | | |
|---|---|---|
| 4,506,910 A | 3/1985 | Bierens |
| 4,787,607 A | 11/1988 | Geno et al. |
| 4,798,369 A | 1/1989 | Geno et al. |
| 4,817,922 A | 4/1989 | Hovance |
| 4,854,557 A | 8/1989 | Goshima et al. |
| 4,923,210 A | 5/1990 | Heider et al. |
| 5,316,273 A | 5/1994 | Vaphiadis |
| 5,346,247 A | 9/1994 | Snyder |
| 5,382,006 A | 1/1995 | Arnold |
| 5,535,994 A | 7/1996 | Safreed, Jr. |
| 5,636,826 A | 6/1997 | Nakagaki et al. |
| 5,671,907 A | 9/1997 | Arnold |
| 5,887,881 A | 3/1999 | Hatch |
| 5,954,316 A | 9/1999 | Voss |
| 6,062,579 A | 5/2000 | Fortier |
| 6,109,598 A | 8/2000 | Hilburger et al. |
| 6,402,128 B1 * | 6/2002 | Trowbridge ............... 267/64.11 |
| 6,416,044 B1 * | 7/2002 | Warinner et al. ........ 267/64.19 |
| 6,427,986 B1 * | 8/2002 | Sakai et al. .............. 188/266.6 |

* cited by examiner

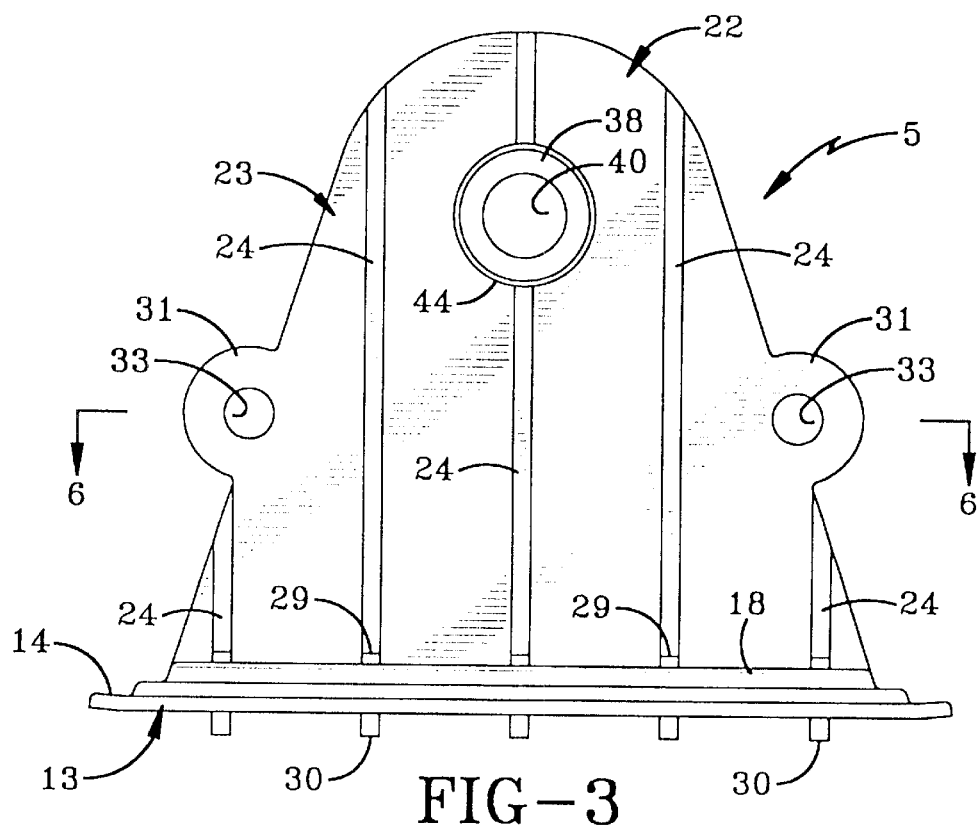
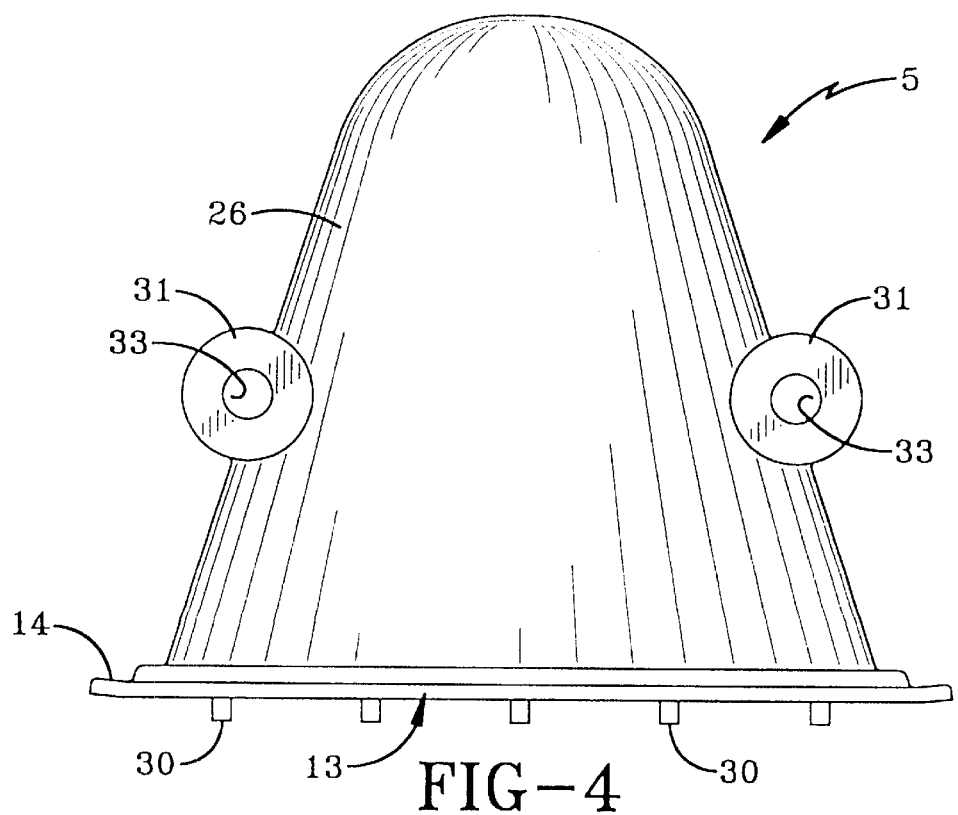

INTEGRAL BRACKET AND END MOUNTING PLATE FOR AIR SPRING

CROSS REFERENCE TO RELATED APPLICATION

This application is a continuation of U.S. Standard Utility application Ser. No. 09/478,641 filed Jan. 6, 2000, now abandoned, which claims priority from U.S. Provisional Application Serial No. 60/160,977 filed Oct. 22, 1999, the disclosures of which are incorporated by reference.

BACKGROUND OF THE INVENTION

1. Technical Field

The invention relates to air springs and in particular to an air spring in which the end plate which is mounted opposite of the piston is formed integrally as a onepiece plastic member combining the end plate with a mounting bracket which is hollow to form an auxiliary fluid chamber. More particularly, the invention relates to such a combination end plate and mounting bracket which is mounted to a supporting structure which is oriented perpendicular to the direction of orientation of the corresponding structure on which the piston is mounted.

2. Background Information

Air actuators and in particular air springs, consist of a pair of spaced end members and an intervening flexible sleeve or bellows formed of an elastomeric material to form an internal pressurized fluid chamber. These devices are used for many applications. One main application is between spaced components of a vehicle for absorbing road shock or supporting parts of machinery and equipment on which shock forces are continually imparted, and for regulating and maintaining the spacing between the two spaced components of various pieces of equipment including vehicles. These air springs usually consist of an upper end member or end plate which is usually attached to the underside of a bracket or support member, and an opposite piston member which is usually mounted to the top surface of a second supporting structure spaced from the first supporting structure. Examples of such air springs and their manner of attachment to spaced structures are shown in U.S. Pat. Nos. 4,564,177; 4,832,317; 4,787,606 and 5,32,139. Other types of air springs are incorporated with a pneumatic or hydraulic damper such as shown in U.S. Pat. Nos. 4,796,870; 4,934,667 and 5,180,145.

However, all of these known prior art air springs and air springs/strut combinations are mounted between two structures having generally parallel aligned surfaces. However, for some applications, it has been found desirable to mount one of the end members, and in particular the top end plate, to a structure such as the sidewall of a chassis frame, which extends perpendicularly to the mounting surface of the opposite structural member on which the piston is mounted. Likewise, it has become desirable to increase the internal volume of the fluid chamber without substantially increasing the size or limiting the stroke of the air spring.

U.S. Pat. No. 5,326,082 shows one type of air spring in which an auxiliary chamber is formed within the interior of the piston member as well as within the interior of the end cap or end member, both of which are formed of a plastic material to reduce corrosion and facilitate the production of the end members. However, again in this air spring structure, the mounting surfaces are parallel to each other and no structure is provided for securing one of the end members, and in particular the end member opposite of the piston, to a mounting surface perpendicular to that of the piston mounting surface.

SUMMARY OF THE INVENTION

The present invention provides an air spring having an integral one-piece end plate and mounting bracket combination for attaching one end of the air spring to a supporting structure.

The combination end plate mounting bracket of the invention comprises an annular end plate formed with a semi-circular wall and a corresponding semi-circular opening, which opening provides fluid communication between the main internal pressure chamber of the flexible sleeve and the auxiliary pressure chamber formed in the bracket. The bracket extends outwardly from the end plate so that the auxiliary fluid chamber is above the end plate.

The mounting bracket and end plate of the invention are formed of a high-strength plastic material which is free from corrosion and can be manufactured relatively easy with a minimum of manufacturing steps. The bracket has an upstanding wall with a generally planar face perpendicular to the semi-circular wall of the end plate for mounting the air spring on a complementary L-shaped member such as the side rail of a vehicle chassis. A half dome-shaped upstanding wall forms the auxiliary fluid chamber with the upstanding planar wall.

Another aspect of the invention preferably provides mounting the end plate and bracket to the open end of an air spring opposite of the air spring piston with the upstanding wall of the bracket being generally perpendicular to the mounting surface on which the piston is adapted to be mounted.

A further aspect of the invention preferably includes providing a plurality of reinforcing ribs extending along the inner and outer surfaces of the upstanding planar wall of the bracket and along the inner surface of a half dome-shaped enclosure wall within the auxiliary fluid chamber, and along the top and bottom surfaces of portions of the end plate wall to form an extremely rigid and strong structure.

A feature of the invention is the providing of a rigid conduit integral with the planar front wall of the bracket which extends perpendicularly outwardly therefrom for subsequent attachment to a remote supply of a pressurized fluid, such as air, into the auxiliary and main fluid chambers of the air spring.

Another feature of the invention is minimizing the number of parts heretofore required for the air spring and providing the end plate with a stepped outer annular flange for attachment of the open end of the flexible sleeve thereto, preferably by a pressure clamp or similar sealing member.

The foregoing advantages, construction and operation of the present invention will become more readily apparent from the following description and accompanying drawings.

BRIEF DESCRIPTION OF THE DRAWINGS

A preferred embodiment of the invention, illustrative of the best mode in which applicants have contemplated applying the principles, is set forth in the following description and is shown in the drawings and is particularly and distinctly pointed out and set forth in the appended claims.

FIG. 3 is an end elevational view of the bracket and end mounting plate removed from the air spring of FIGS. 1 and 2;

FIG. 4 is an opposite end elevational view from that of FIG. 3;

Similar numerals refer to similar parts throughout the drawings.

DESCRIPTION OF THE PREFERRED EMBODIMENT

Figure 1:
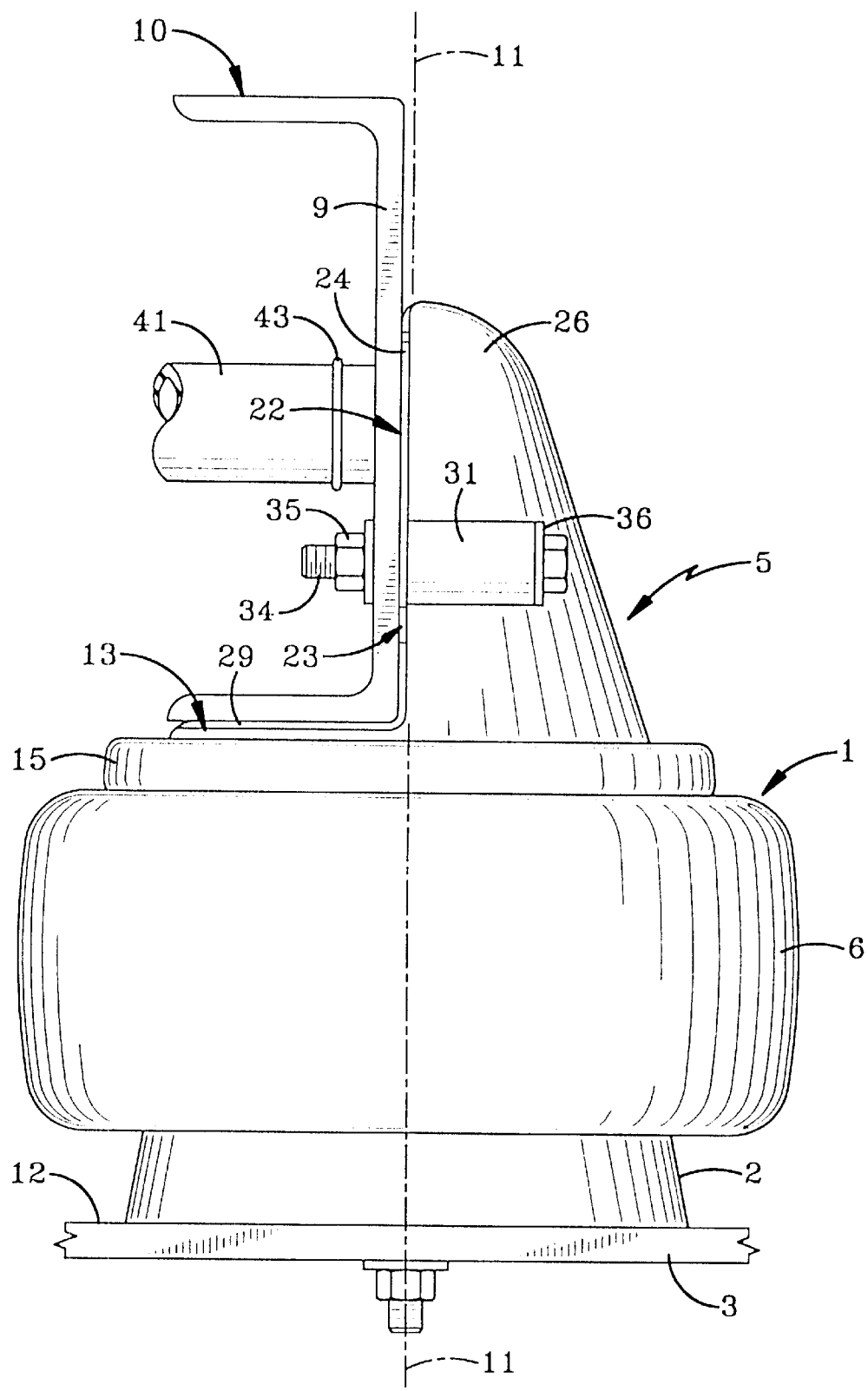
FIG. 1 is an elevational view of an air spring having the integral bracket and end mounting plate incorporated therein mounted between a pair of spaced supports.
Figure 2:
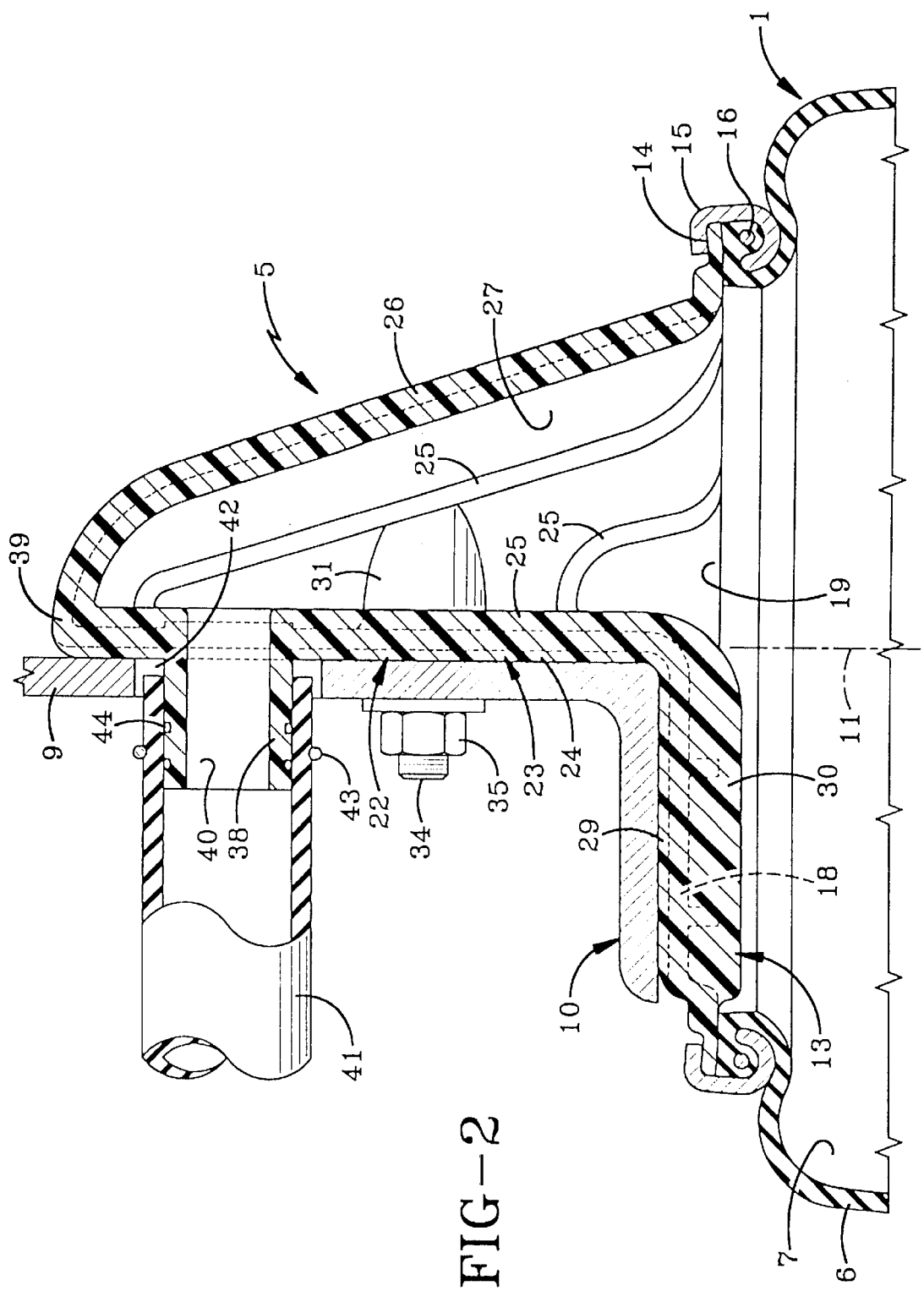
FIG. 2 is an enlarged fragmentary sectional view of the bracket and end mounting plate of the invention attached to an upper portion of an air spring bellows shown in fragmentary section.
Figure 5:
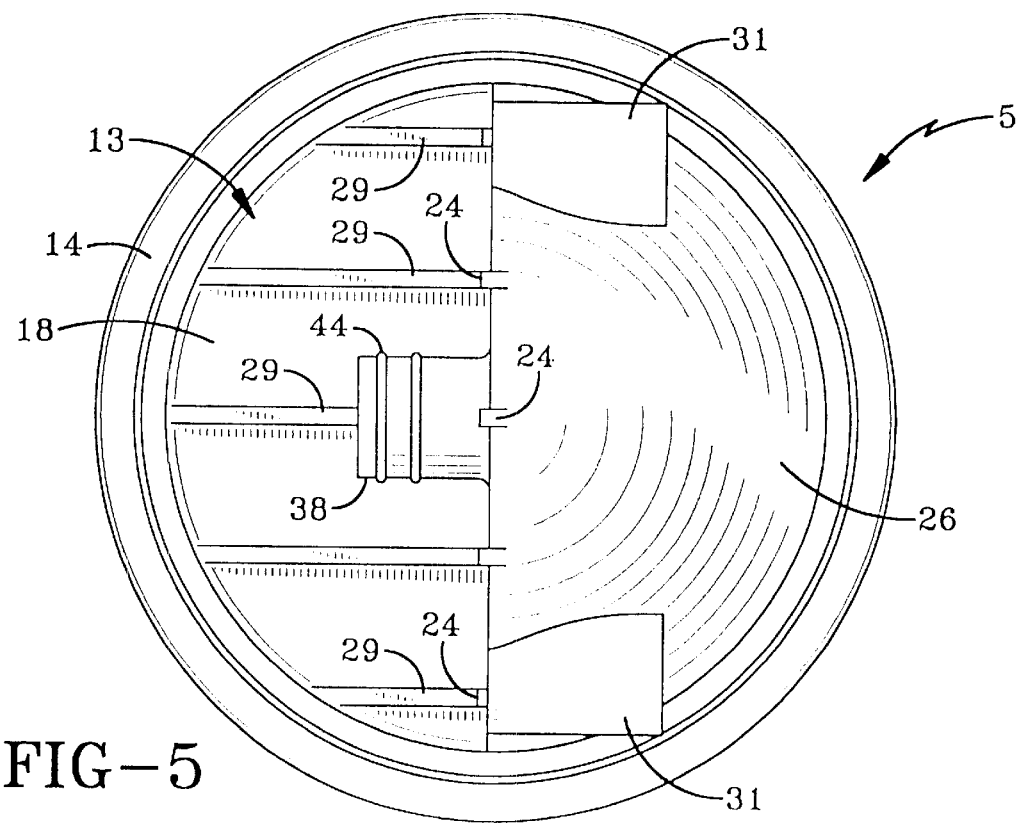
FIG. 5 is a top plan view of the bracket and end mounting plate of FIG. 3.

FIG. 1 shows the integral bracket and end mounting plate of the present invention incorporated within an air spring or air actuator indicated generally at 1. Air spring 1 has a pair of end members, one of which is a piston 2 which is mounted in an upright position on a support plate 3. Support plate 3 could be mounted on the end of a trailing arm, axle plate or similar portion of a vehicle, or any spaced support structures of a piece of equipment with which air spring 1 can be used. The unique bracket and end mounting plate combination of the present invention is indicated generally at 5, and is shown secured to one open end of a flexible sleeve or bellows 6, usually formed of an elastomeric material, which forms an internal fluid pressure chamber 7 (FIG. 2). Combination 5 is shown mounted to a vertical side or web wall 9 of a U-shaped beam 10, which could be one of the chassis frame members of a vehicle. Beam 10 could be other types of supporting structures of a vehicle or other equipment, but in accordance with one of the features of the invention, it will have a mounting surface such as web wall 9, which generally aligns with the longitudinal axis 11 of air spring 1 and perpendicular to the mounting surface 12 of support plate 3 on which piston 2 is mounted.

Figure 7:
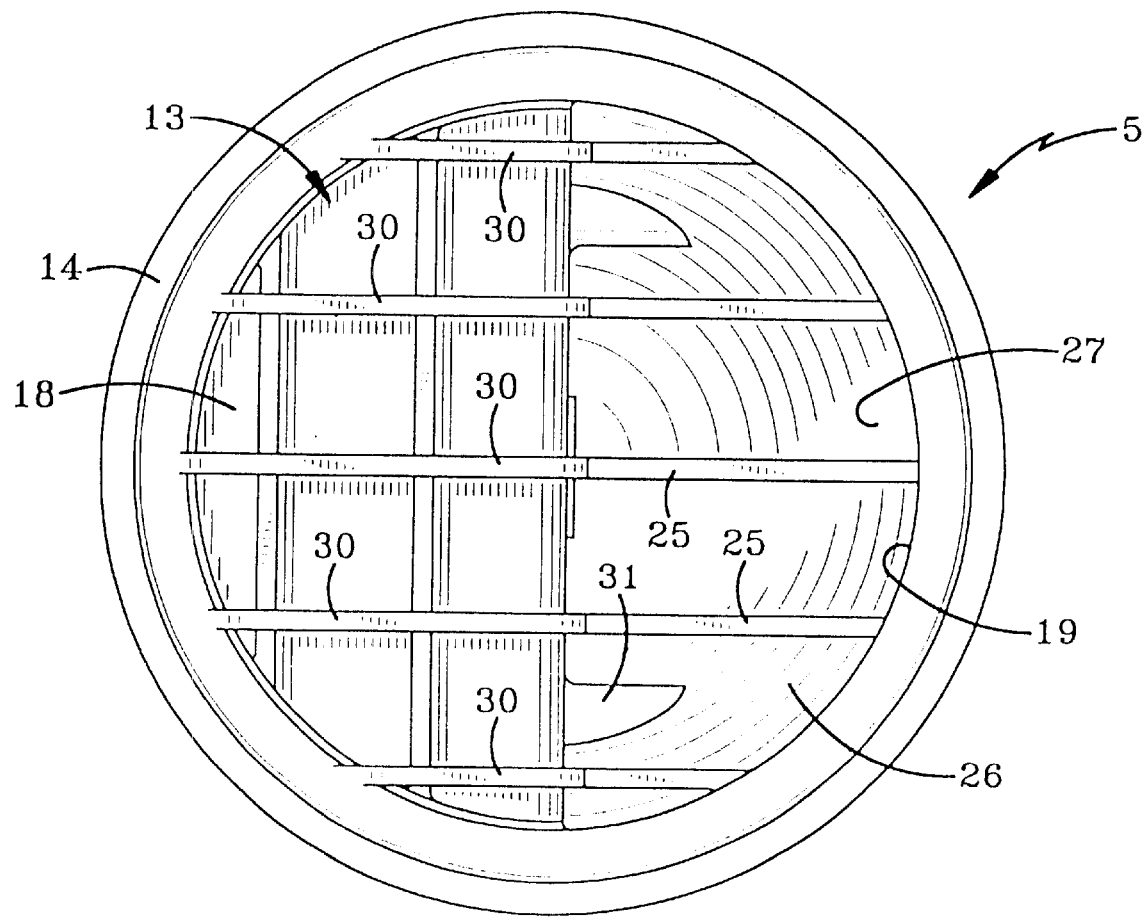
FIG. 7 is a bottom plan view of FIG. 3.

FIG. 2 shows in more detail the structure of the end mounting plate and bracket 5 of the present invention. The end plate portion of combination 5 is indicated generally at 13, and has an annular disc-shaped configuration and is formed with a stepped outer peripheral flange 14. A pressure clamp 15 sealingly clamps bead area 16 of sleeve 6 against flange 14 to form a fluid tight sealing engagement with the end plate. However, other types of clamping arrangements can be used to replace clamp 15 without effecting the invention. End plate 13 further includes a generally semi-circular shaped planar wall 18 (FIGS. 2 and 7), and a generally semi-circular shaped opening 19. Bracket portion 22 of the bracket and end mounting plate combination 5, includes a generally planar upstanding wall 23 which has a somewhat triangular-shaped configuration as shown in FIG. 3, and which includes a plurality of spaced parallel reinforcing ribs 24 formed integrally on its outer surface and extending throughout the vertical length thereof. A half dome-shaped enclosure wall 26 together with upstanding wall 23 forms an auxiliary air chamber 27 which is located above end plate 13 and in fluid communication with main pressure chamber 7.

In addition to ribs 24 on the outer surface of wall 23, a plurality of ribs 25 extend along the inside surface of wall 23 and continue along the inside surface of enclosure wall 26 (FIGS. 2, 6 and 7) within fluid chamber 27. A plurality of reinforcing ribs 29 and 30 also extend along the top and bottom surfaces, respectively, of semi-circular wall 18 of end plate 13 to provide for an extremely strong and rigid mounting bracket and end plate structure.

Figure 6:
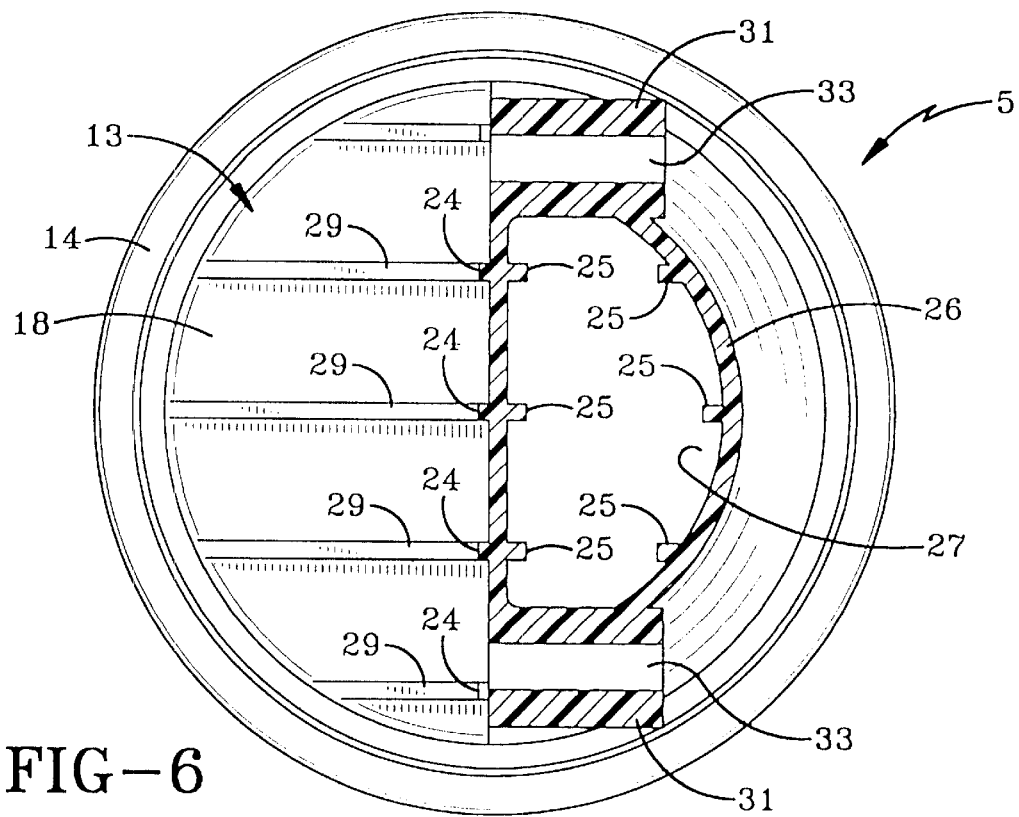
FIG. 6 is a sectional view taken on line 6—6, FIG. 3.

A pair of mounting bosses 31 are formed integrally with upstanding wall 23 and portions of enclosure wall 26 for securing bracket and end mounting plate 5 to flange wall 9 (FIGS. 1 and 6). Bosses 31 preferably are formed with a hollow bore 33 through which bolts 34 extend for clamping wall 23 tightly against wall 9 by a nut 35 and a rear retaining washer 36. Other types of attachment means and fasteners can be used for securing wall 23 generally flush against wall 9 than bolts 34 shown in the drawings.

In accordance with another feature of the invention, a rigid conduit 38 is formed integrally with planar wall 23, preferably adjacent upper end 39 of wall 23 where it merges with enclosure wall 26. Conduit 38 has a hollow bore 40 and is adapted to be connected to a fluid supply line 41 which is connected to a compressor or other fluid pressure device for regulating the flow of air into and out of fluid chambers 7 and 27. Fluid supply line 41 may be secured to conduit 38 by a clamp ring 43, and preferably a plurality of O-rings 44 provide sealing engagement between conduit 38 and fluid supply line 41. Conduit 38 preferably extends through an opening 42 formed in web wall 9.

Combination end plate and mounting bracket 5, preferably is formed of a high strength plastic material, or other types of lightweight materials which are well known in the air spring industry to provide for a corrosion resistance structure.

Accordingly, the improved integral bracket and end mounting plate for air spring is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved integral bracket and end mounting plate for air spring is construed and used, the characteristics of the construction, and the advantageous, new and useful results obtained; the new and useful structures, devices, elements, arrangements, parts and combinations, are set forth in the appended claims.

What is claimed is:
1. An air spring including:
a) first and second end members adapted to be mounted at spaced locations on first and second structures respectively, at least one of which is moveable in a generally axial direction with respect to the other;
b) a flexible sleeve having first and second open ends sealingly engaged with the first and second end members, respectively, forming a main fluid chamber within the sleeve for containing a pressurized fluid; and
c) the first end member including an end plate having a semi-circular generally planar wall and an outer peripheral edge sealingly connected to the first open end of the flexible sleeve and an upstanding bracket formed integral with the end plate and extending outwardly therefrom, said bracket having an internal cavity providing an auxiliary fluid chamber located outwardly of the end plate and in fluid communication with the main fluid chamber, said bracket further including an upstanding generally planar wall which extends generally perpendicular to the end plate planar wall and which is adapted to abut against the first structure; and attachment means for attaching said bracket to said first structure.

2. The air spring defined in claim 1 in which a rigid conduit extends outwardly from the upstanding planar wall of the bracket generally parallel with the semi-circular wall of the end plate; and in which said rigid conduit is hollow and is in fluid communication with the auxiliary fluid chamber.

3. The air spring defined in claim 1 in which the bracket further includes a generally half-dome shaped wall which is connected to the upstanding wall and forms the auxiliary chamber therebetween.

4. The air spring defined in claim 1 in which the attachment means include at least two hollow bosses for receiving attachment bolts therethrough.

5. The air spring defined in claim 1 in which the end wall and bracket are formed as an integral one-piece member of a high strength plastic material.

6. The air spring defined in claim 3 in which a plurality of reinforcing ribs extend along the half-dome shaped wall and the upstanding wall of the bracket within the auxiliary chamber.

7. In combination, first and second spaced apart support structures and a fluid actuated member having first and second end members and a flexible sleeve extending between said end members forming an internal main fluid chamber, each of said end members being connected to a respective one of said support structures; said first end member including an end plate and an upstanding bracket forming an auxiliary fluid chamber above said end plate and in fluid communication with the main fluid chamber through an opening formed in the end plate, said bracket having an upstanding wall extending generally parallel with a longitudinal axis of the flexible sleeve and includes attachments for mounting said upstanding wall on the first support structure.

8. The combination defined in claim 7 in which the upstanding wall of the bracket forms a general right angle with the end plate.

9. The combination defined in claim 7 in which the attachments include at least a pair of fasteners extending between the first support structure and the upstanding wall of the bracket.

10. The combination defined in claim 9 in which a pair of bosses is formed on the bracket; and in which the pair of bolts extend through holes formed in the first support structure and through the hollow bosses to form the attachments.

11. The combination defined in claim 7 in which the first support structure includes at least an L-shaped portion; and in which the end plate and upstanding wall of the bracket abut against a corresponding part of said L-shaped portion.

12. The combination defined in claim 7 in which an air inlet opening is formed in the upstanding wall of the bracket and aligns with an opening formed in an upstanding portion of the first support structure.

13. The combination defined in claim 7 in which the end plate is annular and terminates in an outer peripheral edge; in which the flexible sleeve is sealingly clamped to said outer edge of the end plate; and in which the end plate is formed with a generally semi-circular opening which aligns with the main fluid chamber.

14. An integral one-piece combination end plate and mounting bracket for sealing engagement with an open end of a flexible sleeve of an air actuator and for mounting one end of said actuator to a support structure, said mounting bracket having an upstanding wall extending generally perpendicular to the end plate and an enclosure wall which forms an auxiliary fluid chamber with said upstanding wall, said auxiliary chamber being located above the end plate and within the mounting bracket; and attachments for connecting the upstanding wall to the support structure.

15. The combination defined in claim 14 in which a plurality of reinforcing ribs extend along the upstanding wall and the enclosure wall within the auxiliary fluid chamber.

16. The combination defined in claim 14 in which the end plate is generally annular and is formed with a generally semi-circular end wall and a generally semi-circular opening which provides for the fluid communication between the auxiliary fluid chamber and main fluid chamber.

17. The combination defined in claim 16 in which the end plate terminates in a stepped annular peripheral flange; and in which an annular clamp is attached to said terminating flange to provide the sealing engagement with an open end of the flexible sleeve.

18. The combination defined in claim 14 in which a fluid conduit extends outwardly from the upstanding wall of the bracket for connection to a supply of pressurized fluid.

19. The combination defined in claim 14 in which the enclosure wall is a generally half-dome shaped wall.

20. An air spring including:
a) first and second end members adapted to be mounted at spaced locations on first and second structures respectively, at least one of which is moveable in a generally axial direction with respect to the other;
b) a flexible sleeve having a longitudinal axis and first and second open ends sealingly engaged with the first and second end members, respectively, forming a main fluid chamber within the sleeve for containing a pressurized fluid; and
c) the first end member being an integral one piece member including an end plate extending generally perpendicular to the longitudinal axis of the flexible sleeve sealingly connected to the first open end of the flexible sleeve and a bracket extending outwardly from said end plate; said bracket having an internal cavity providing an auxiliary fluid chamber located outwardly of the end plate and in fluid communication with the main fluid chamber of the flexible sleeve, and an upstanding wall generally perpendicular to the end plate and generally parallel with the longitudinal axis of the flexible sleeve adapted to abut against the first structure; and d) attachments for attaching said upstanding wall of the bracket to said first structure.

21. The air spring defined in claim 20 in which a rigid conduit extends outwardly from the upstanding wall of the bracket generally parallel with the end plate; and in which said rigid conduit is hollow and is in fluid communication with the auxiliary fluid chamber.

22. The air spring defined in claim 21 in which the end plate includes a semi-circular wall and the bracket includes a generally half-dome shaped wall which is connected to the upstanding wall and forms the auxiliary chamber therebetween.

23. The air spring defined in claim 22 in which a plurality of reinforcing ribs extend along the half-dome shaped wall and the upstanding wall of the bracket within the auxiliary chamber.

24. The air spring defined in claim 20 in which the attachments include at least two hollow bosses formed on the upstanding wall for receiving bolts therethrough.

25. The air spring defined in claim 20 in which the end wall and bracket are formed as an integral one-piece member of a high strength plastic material.

* * * * *